United States Patent [19]

Marhic

[11] Patent Number: 4,907,851
[45] Date of Patent: Mar. 13, 1990

[54] SINGLE-MODE 1×N HOLOGRAPHIC FIBER OPTICS COUPLER

[75] Inventor: Michel E. Marhic, Evanston, Ill.

[73] Assignee: Northwestern University, Evanston, Ill.

[21] Appl. No.: 99,548

[22] Filed: Sep. 22, 1987

[51] Int. Cl.$^4$ ............................................. G02B 6/34
[52] U.S. Cl. ................................. 350/96.19; 350/3.7; 350/96.16
[58] Field of Search ............... 350/96.15, 96.18, 96.19, 350/96.20, 3.7, 162.2

[56] References Cited

U.S. PATENT DOCUMENTS

| | | | |
|---|---|---|---|
| 4,274,706 | 6/1981 | Tangonan | 350/96.16 X |
| 4,337,993 | 7/1982 | Kompfner | 350/3.7 X |
| 4,465,332 | 8/1984 | Horner et al. | 350/96.19 |
| 4,540,236 | 9/1985 | Fantone | 350/3.70 |
| 4,550,973 | 11/1985 | Hufnagel | 350/3.7 |
| 4,696,536 | 9/1987 | Albares et al. | 350/96.19 |
| 4,736,360 | 4/1988 | McMahon | 350/96.19 X |
| 4,824,193 | 4/1989 | Maeda et al. | 350/96.19 X |

OTHER PUBLICATIONS

M. E. Marhic, et al., "Holographic 1×N Couplers for Single-Mode Fibers," Dept. of Biom. Eng., Cambridge, MA, (1986).
R. P. Marsden, "Optical Fibers for Digital Video Interconnections in Television Studio Centers," Paper 585-09, 2nd International Symposium on Optical and Electro-Optical Applied Science and Engineering, Nov. 1985, Cannes, France.
G. R. Hill, et al., "The Application of Coherent Optical Fiber Techniques to Broadway Networks," Paper 585-15, 2nd Intern. Symposium on Optical and Electro-Optical Applied Science & Eng., Nov., 1985, Cannes, France.
D. B. Payne, et al., "Single Mode Optical Networks," Paper 585-30, 2nd International Symposium on Optical and Electro-Optical Applied Science and Engineering, Nov., 1985, Cannes, France.
C. J. Todd, "Wideband Local Networks Exploiting Single Mode Fibers," Paper MD2, Ninth Conference on Optical fiber Communications, Feb., 1986, Atlanta, Ga.
M. E. Marhic, "Hierarchic and Combinatorial Star Couplers," Optics Letters 9 p. 368 (1984).
M. E. Marhic, "Combinatorial Star Couplers for Single Mode Fibers," FOC/LAN 84, Aug. 20, 1984, Law Vegas, Nevada.
J. Saniter, et al., "LOCNET: An All-Optical Wideband Local Area Network," Paper TuJ3, Eighth Conference on Optical Fiber Communication, Feb. 11–13, 1985, San Diego, CA.
C. C. Wang, et al., "9×(Single-Mode Fiber-Optic Star Couplers," Optics Letters 10, p. 49 (1985).
S. A. Netwon, et al., "Single-Mode-Fiber 1×N Directional Coupler," Optics Letters 8, p. 60 (1983).
T. Findakly, et al., "Single-Mode Integrated Optical 1×N Star Coupler," App. Phys. Lett. 40, p. 549 (1982).
U. Killat, et al., *Fiber And Integrated Optics*, vol. 4, No. 2, p. 159 (1982).
H. Machida, et al., "High Efficiency Fiber Grating for Producing Multiple Beams of Uniform Intensity," Appl. Opt. 23, p. 330 (1984).
J. W. Goodman, *Introduction to Fourier Optics*

(List continued on next page.)

Primary Examiner—John D. Lee
Assistant Examiner—Phan T. Heartney
Attorney, Agent, or Firm—Welsh & Katz, Ltd.

[57] ABSTRACT

A holographic 1×N single-mode fiber optics coupler for coupling a single-mode monochromatic fiber optics input to N single-mode fiber optics outputs. A hologram of the output fiber bundle or the equivalent is recorded and then a reconstructed image is generated by illuminaing the hologram by means of a single-mode input signal on a single-mode optical fiber. The holographically generated image of the original fiber optics bundle is then coupled to the original fiber bundle or a substantially equivalent output fiber optics bundle providing a high efficiency, compact, and low cost 1×N fiber optics coupler with self-alignment features.

15 Claims, 2 Drawing Sheets

OTHER PUBLICATIONS (McGraw-Hill, New York, 1968), ch. 8, "Wavefront-Reconstruction Imaging, or Holography", 198–205.

T. Tamura, et al., "Optical Cascade Star Network–A New Configuration for a Passive Distribution System with Optical Collision Detection Capability," J. of Lightwave Technology, LT-2, p. 61 (1984).

R. K. Kostuk, et al., "Imaging Interconnects for Integrated Circuits," Paper ThP2, Annual Meeting of the Optical Society of America, Oct. 30–Nov. 2, 1984, San Diego, CA.

R. K. Kostuk, et al., "Multiple Image Reflection Volume Holographic Optical Elements," Paper ThL2, Annual Meeting of the Optical Society of America, Oct. 14–18, 1985, Washington, D.C.

E. S. Gaynor, et al., "Holographic VLSI Interconnects," Paper WA105, Southwest Conference on Optics, Màr. 4,–8, 1985, Albuquerque, New Mexico, (SPIE Proceedings Vol. 540).

"Holographic Recording Materials," H. M. Smith ed., Topics in Applied Physics, vol. 20 (Springer-Verlag, New York, 1977).

W. B. Joyce et al., "Alignment of Gaussian Beams," Appl. Opt. 23, p. 4187 (1984).

G. Raviv, et al., "Fiber Optic Beam Delivery for Endoscopic Holography," Optics Comm. 55, p. 261 (1985).

K. M. Johnson, et al., "Multiple-Exposure Hologram", Appl. Opt. 24, p. 4467 (1985).

N. Nishihara, "Holocoupler: A Novel Coupler for Optical Circuits," IEEE Journal, p. 794 (1975).

O. D. D. Soares, "Holographic Coupler for Fiber Optics," Opt. Eng. 20, p. 740 (1981).

A. M. P. P. Leite, et al., "Holographic Coupler for Fibre Optics Communications," SPIE 213, p. 10, (1979).

A. M. P. P. Leite, et al., "Optical-Fibre-Bundle Holographic Coupler," *Microwaves, Optics and Acoustics,* vol. 2, No. 2 (Mar. 1978).

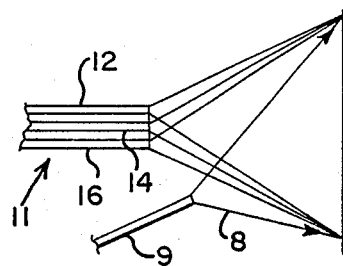
Fig_1A_
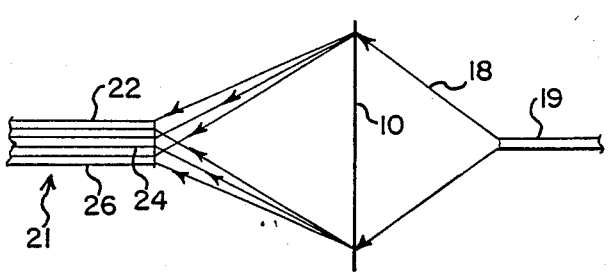
Fig_1B_
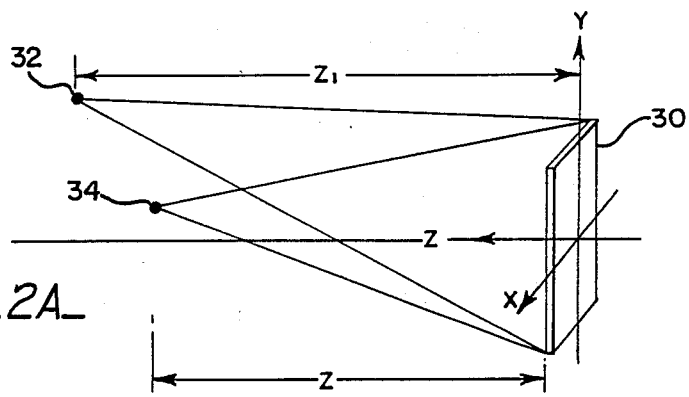
Fig_2A_
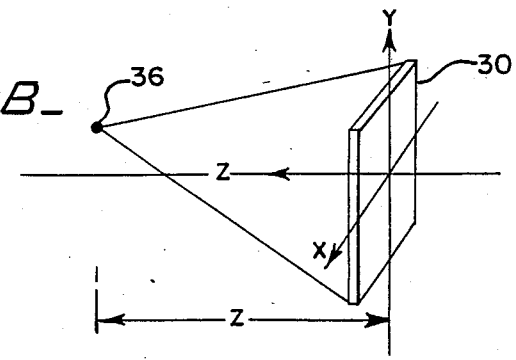
Fig_2B_
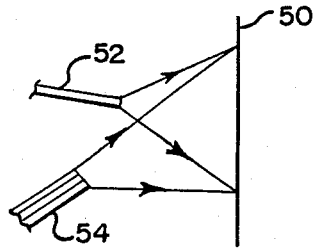
Fig_3A_
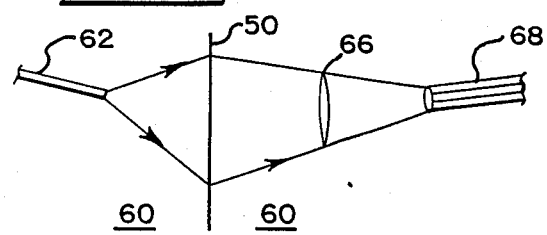
Fig_3B_

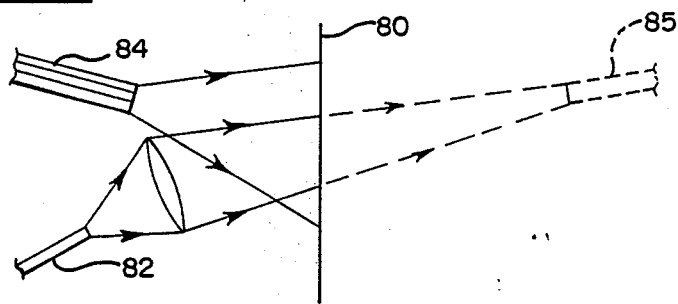
FIG_4A_
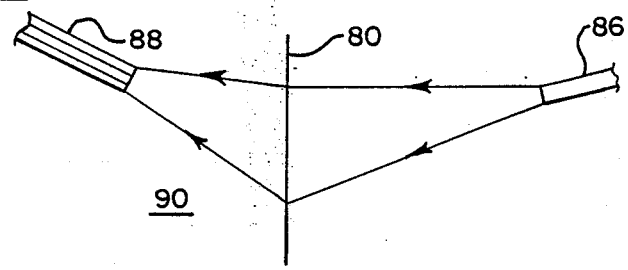
FIG_4B_
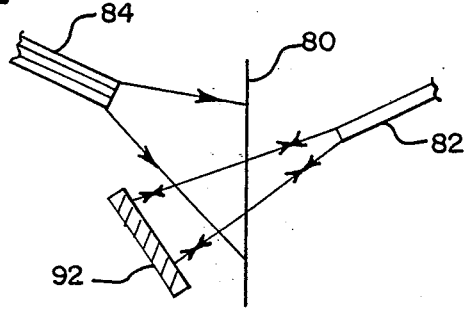
FIG_4C_
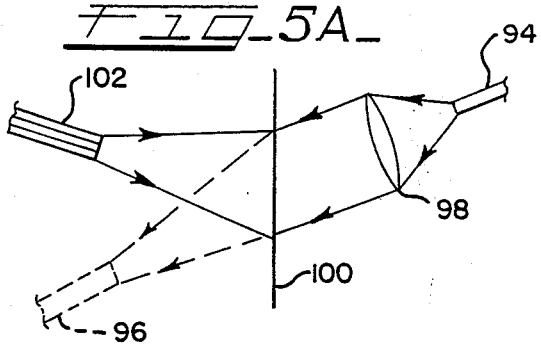
FIG_5A_
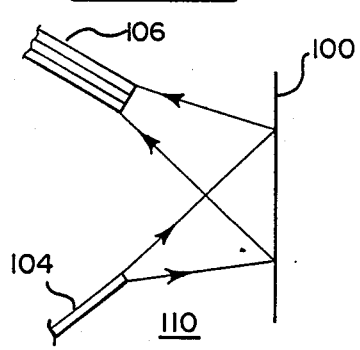
FIG_5B_

– 4,907,851 –

SINGLE-MODE 1×N HOLOGRAPHIC FIBER OPTICS COUPLER

BACKGROUND OF THE INVENTION

This invention relates generally to the field of fiber optics coupling devices and more particularly to a one to many fiber (1×N) single-mode holographic optical coupler.

As communications needs have expanded in modern times, the need for high speed, wide bandwidth communications networks has grown dramatically. Consequently, use of fiber optics communications networks have developed rapidly. Thus, there is a great need for optical fiber couplers, particularly for broad band single-mode couplers to permit interconnection to many users. One type of coupler which is highly useful for such systems is a 1×N coupler for distribution of the signal from one port to many ports (i.e., 1 fiber to many fibers). Multimode 1×N couplers exist in the prior art but are limited in bandwidth and mode structure and are thus unsuitable for many integrated optical systems. Thus, single-mode 1×N couplers are highly desirable. Demultiplexing 1×N couplers also exist in the prior art for demultiplexing N different wavelengths and channeling them to N output fibers, but such demultiplexers perform an entirely different function than a single-mode monochromatic 1×N fiber coupler.

Single-mode 1×N fiber couplers have been constructed using a tree of 3 dB fiber couplers. Alternatively, N×N star couplers can be utilizing as 1×N couplers by using only one input branch. Either one of these approaches, however, results in excessively complex fabrication and high cost. Another approach utilizes N consecutive taps on an input fiber with each tap having an appropriately adjusted coupling fraction to achieve a 1×N coupler. Integrated optics techniques have also been used to produce a 1×N coupler, but this approach limits N and introduces excess loss due to fiber-to-waveguide coupling losses and waveguide losses. A technique using lenses for coupling between input fibers and a bundle of output fibers has been suggested but results in low efficiency because of the large size differences between the core and cladding of typical single-mode fibers. Gratings have been suggested to generate multiple orders of diffraction from the input beam, but this approach requires lenses and accurate alignment. Thus, each of these approaches are limited in practice due to problems of cost, maximum size, efficiency, or difficulty of fabrication.

It is accordingly an object of the invention to provide a novel holographic 1×N single-mode fiber optics coupler which is efficient, cost effective, and easily fabricated.

It is another object of the invention to provide a novel holographic 1×N single-mode fiber optics coupler which can accommodate irregular fiber arrays and for which a whole monolithic array may be aligned at once, thereby simplifying fabrication.

It is yet another object of the invention to provide a novel holographic 1×N single-mode fiber optics coupler which is compact and has an overall efficiency approaching 50% regardless of the value of N.

Briefly, according to one embodiment of the invention, a holographic 1×N single-mode fiber optics coupler for dividing a single-mode fiber optics input into N single-mode outputs is provided. The apparatus includes input means for input of a single-mode fiber optics input signal, holographic means for holographically imaging the single-mode fiber optics input signal into an array of N single-mode optical signals, and output means for coupling the N optical signals to N output optical fibers.

BRIEF DESCRIPTION OF THE DRAWINGS

The features of the present invention which are believed to be novel are set forth below with particularity in the appended claims. The invention, together with further objects and advantages thereof, may be understood by reference of the following description taken in conjunction with the accompanying drawings.

FIG. 1A is a general diagrammatic illustration of a specific embodiment of a system for recording a transmission hologram for a 1×N single-mode fiber optics coupler according to the invention.

FIG. 1B is a general diagrammatic illustration of a specific embodiment of a 1×N holographic single-mode fiber optics coupler according to the invention.

FIG. 2A is a diagrammatic illustration of an elementary holographic structure for recording a transmission hologram for a 1×N single-mode holographic coupler according to the invention.

FIG. 2B is a general diagrammatic illustration of a specific embodiment of a system for the reconstruction of a transmission hologram for a 1×N fiber optics coupler according to the invention.

FIG. 3A is a diagrammatic illustration of a specific embodiment of a structure for recording a hologram for a 1×N single-mode fiber coupler according to the invention in which a lens is utilized to form a real output image.

FIG. 3B is a diagrammatic illustration of the structure of a specific embodiment of a 1×N single-mode fiber coupler according to the invention in which a lens is utilized to form a real output image.

FIG. 4A is a diagrammatic illustration of a specific embodiment of the structure for the recording of a hologram for a 1×N single-mode fiber according to the invention in which a lens is used to expose the hologram.

FIG. 4B is a diagrammatic illustration of the structure of a specific embodiment of 1×N single-mode fiber coupler according to the invention utilizing the hologram of FIG. 4A or FIG. 4C.

FIG. 4C is a diagrammatic illustration of the alternate structure for recording of the hologram of FIG. 4B using a phase conjugating mirror.

FIG. 5A is a diagrammatic illustration of a specific embodiment of a structure for recording a reflection hologram for a 1×N single-mode fiber coupler according to the invention.

FIG. 5B is a diagrammatic illustration of the structure of a specific embodiment of a 1×N single-mode fiber coupler according to the invention utilizing a reflection hologram.

DETAILED DESCRIPTION OF THE PREFERRED EMBODIMENT

FIG. 1A is a diagrammatic illustration of a specific embodiment of a system for recording a transmission hologram 10 of a fiber bundle 11 composed of multiple single-mode fiber (N=3 in the illustration of FIG. 1a) sources 12, 14, 16. The hologram 10 consists of a photographic record of the elementary interference pattern resulting from the superposition of the optical waves from the fiber sources 12, 14, 16 (which approximate point sources), and a reference wave from a reference source 9, as shown. Reconstruction of an identical image of the fiber sources 12, 14, 16 can be achieved when the recorded hologram is illuminated by a coherent illumination source preferably of the same frequency as the original point source.

The hologram 10 can be utilized as a single-mode 1×N fiber optics coupler, as illustrated in FIG. 1B, because each fiber source in the fiber bundle of N fibers is an approximation of a point source. Thus, by recording a hologram of a desired bundle of N fibers and then illuminating the recorded hologram with an input wave from a single-mode input optical fiber 19, an output pattern of N equal intensity, single-mode real images of the N fibers of the fiber bundle 11 is produced. This array of point source images (i.e., the image of the N fiber sources 12, 14, 16) is then coupled to an array 21 of N output single-mode fibers 22, 24, 26, as shown in FIG. 1B. The array of output fibers 21 corresponds to the recorded fiber bundle 11 and is placed at the location of the real image of the fiber sources 12, 14, 16. Couplers in which a virtual image of the fiber optics bundle 11 is formed can be constructed using a lens to create a real image from the virtual image.

In the illustrated embodiment, the output light pattern is preferably an exact match of the fiber array 21 used as the output fibers. This may be accomplished by recording the hologram using the output fiber array or an array substantially identical to it, as the object source and maintaining a magnification of one to minimize fabrication complexity. This permits automatic pattern matching of the output array. In addition, in situ recording and development of the hologram 10 may be used to permit automatic alignment of the hologram light array pattern with the output fiber array 21. Thus, the individual alignment of each output fiber is not required, resulting in low cost and ease of fabrication.

The elementary holographic structures for recording and illumination of a hologram for use as a 1×N holographic coupler according to the invention are shown diagrammatically in FIGS. 2A and 2B. In FIG. 2A a hologram 30 is exposed by illuminating it with two point sources, a reference source 32 and an object source 34, comparable to the light from single-mode fibers. In a 1×N coupler, the object source 34 is a source of multiple point sources (i.e., a multiple fiber bundle of N fibers). Once the hologram 30 has been exposed and developed, and then returned to the position it was in during exposure, images are holographically reconstructed by illuminating the hologram 30 by another point source 36 referred to as a reconstruction source. Preferably, the wavelength of the reconstruction source is the same as the wavelength of the reference and object sources in the illustrated embodiment.

Under these conditions, two point source reconstructed images (not shown) are formed which are complex conjugates of one another. The images formed may be virtual (i.e., the reconstructed wavefront expands outward) or real images (i.e., the reconstructed wavefront converges). The location and magnification (unity magnification is preferable for ease of fabrication), and whether the images are virtual or real is determined by the location of the reference source 32, the object source 34, and the reconstruction source 36.

In general, using a hologram structure in which a real image is generated, the real image can be used to couple light directly into the output fibers placed at the real image location. If a virtual image is generated, a lens may be used behind the hologram to produce a real image which may be used to coupled the light to the output fibers. In a 1×N holographic coupler such as illustrated in FIGS. 1A and 1B, the object source is the array of N fibers 11, the reference source is the reference source fiber 9, and the reconstruction source is the input fiber 19. This structure generates a real image which is coupled to the output fiber bundle 21.

In a holographic structure in which a virtual image is created upon reconstruction, the virtual image may be transformed into a real image by means of a lens placed behind the hologram. FIGS. 3A and 3B illustrate the fabrication and illumination of an embodiment of a 1×N coupler 60 according to the invention in which a hologram 50 creates a virtual image upon illumination and a lens is used to image the output sources into a real image. As shown in FIG. 3A, the hologram 50 may be exposed by a reference source 52 and an object source fiber array 54. The 1×N coupler 60 is then constructed by developing the hologram and returning it to the same effective position as it occupied during exposure, as shown in FIG. 3B. Using a reconstruction source 62 (i.e., input fiber) to illuminate the hologram 50, a virtual image is generated. The wavefront generated from the hologram is further imaged by a lens 66 which forms a real image at the location at which an output fiber array 68 is placed, as shown. This structure results in coupling of the real image of the fiber sources of the array 54 to the output fibers 68. Since the real image generated is identical to that used during exposure, an output fiber array equivalent to the input (i.e., object) array 54 may be aligned as a unit thereby avoiding the need to separately align each individual fiber.

Referring now to FIGS. 4A and 4B, there is illustrated a structure for fabrication and illumination of an embodiment of a 1×N coupler according to the invention in which a lens is used to expose a hologram 80. As shown in FIG. 4A, the hologram 80 may be exposed by a reference source 82 which is focused to a converging wavefront effectively generating a virtual source 85. A conventional object source comprising a fiber bundle 84 may be used in conjunction with the reference source 82 to expose the hologram 80. A 1×N coupler 90 according to the invention may be fabricated after the hologram 80 is developed by returning it to the same effective position as occupied during exposure and illuminating the hologram 80 with an input fiber source 88 positioned at the location of the virtual image of the reference source 82. The output fiber array 88 may then be placed at the location of the real image of the object source 84 which is actually the location of the original bundle 84, as shown, to couple the fiber source images to the output fibers of the fiber array 88. This structure utilizes a positive lens 81 to create the converging wavefront, but since a real image is generated upon reconstruction, no lens is needed in the 1×N coupler structure 90. The alignment of the reference source in exposing the hologram of FIG. 4A may be facilitated by placing a fiber input at the point of convergence of the desired wavefront and insuring that the converging wave can be effectively coupled to the fiber. FIG. 4C illustrates an alternative method of recording the hologram 80 by generating the reference wave by passing it through the plate of the hologram 80 and reflecting upon itself using a phase conjugate mirror (e.g., a spherical mirror may be used) to produce the converging wavefront. By using a thermoplastic camera, the reflection hologram will be recorded and by processing in situ, repositioning errors are avoided.

FIGS. 5A and 5B illustrate the fabrication and structure of an embodiment of a 1×N single-mode fiber coupler 110 utilizing a reflection hologram 100. As shown in FIG. 5A, the hologram 100 may be exposed by a reference source 94 which is focused into a converging wavefront by a lens 98 effectively creating a virtual source 96. In addition, a conventional object source comprising a fiber bundle of fiber sources 102 may be used in conjunction with the reference source 94 to expose the hologram 100. A single-mode 1×N fiber coupler 110 according to the invention may then be constructed after the hologram is developed to produce the reflection hologram 100. The reflection hologram 100 is then located in a position comparable to its position during exposure and illuminated by a reconstruction source (i.e., input fiber) 104 to create a reflected wavefront, which is a real image of the original object fiber bundle sources 102. The output fiber bundle 106 substantially identical to the object fiber bundle 102 is then located at the position of the real image created by the reflection hologram 100, as shown, thereby coupling the imaged optical signals from the input fiber 104 to the output fibers of the fiber bundle 106. In the structures of FIGS. 4B and 5B, the alignment of the output fibers 88 and 106 can be greatly simplified by using in situ techniques in which the object fiber bundles 84 and 102 remain in their original positions and they are utilized as the output fiber bundles 88 and 106.

When using these transmission holograms, there are actually two main images formed by the hologram upon reconstruction (i.e., complex conjugates of each other, a primary image is coupled to the output fibers, and a secondary image is lost), maximum efficiency is limited to approaching 50% since at least half of the input signal is lost to the unused image. In addition, inefficiencies can result from other images that are created due to diffraction from intermodulation interference patterns created as a result of the fact that more than two point sources are recorded. These extra images result in some of the input optical power being imaged at points other than the primary and secondary image points resulting in further power lost. However, this loss can be reduced to near negligible by using a reference source which is so much stronger than the object source during exposure that it dominates the interference effects. Thus, in fabricating the holograms for the holographic 1×N single mode fiber couplers of the invention, the reference source is typically of much greater intensity than the object sources during exposure.

The efficiency of the holographic couplers of the invention is also affected by the efficiency of the hologram itself, which is somewhat dependent upon the type of hologram and the materials used. For example, photopolymer materials have been known to produce diffraction efficiencies for transmission holograms in the order of 80%, while efficiency of reflection holograms approaches 100%. The high efficiency which can be achieved with the holographic oouplers of the instant invention is also independent of the total number of output fibers N. As a result, the holographic couplers of the invention are highly suitable for 1×N couplers of large N where low loss is of crucial importance.

Another source of losses in the holographic 1×N couplers are shifts of image locations due to diffraction effects. These effects may be minimized by configuring the holographic structure so that the distance of the reference source from the hologram is much less than the distance of the object source from the hologram during exposure and to use a reference beam which is broader than the beams emerging from the fibers. In addition, the emulsion may be run into saturation in order to achieve a flatter profile for the recorded interference pattern, and a thick hologram may be used so that the reflectivity of the Bragg reflections can be made uniform over a large range of radiances. Efficiency may also be increased by constructing a coupler in which a second bundle is placed at the location of a secondary image in order to capture the light of the secondary image thereby increasing the overall efficiency of the coupler by a factor of two. In addition, the fabrication of an angle-selective thick hologram may be used to increase efficiency by eliminating the secondary image.

In order to record a hologram for the 1×N coupler which will exhibit maximum contrast, efficiency and uniformity of reconstructed sources, it is preferable that the outputs of the fibers during recording have the same amplitude and polarization state and the reference beam should also have the same polarization state. The amplitude control of the individual fibers can easily be achieved by reducing them all to an equal level of weakness by reducing all to the level of the weakest one by a simple loss control mechanism such as bending. Once the hologram for the 1×N coupler has been generated, additional holograms may be made directly from the existing hologram in a single reproducing step. While maximum efficiency is also obtained by maintaining the same frequency during recording and utilization of the 1×N coupler structure, a wide range of frequency may be obtained by using a holographic compensating technique such as use of two holographic elements made in such a way that the chromatic dispersion of one exactly compensates for that of the other.

Specific embodiments of 1×N single-mode holographic fiber optics couplers have been described herein for purposes of illustrating the manner in which the invention may be made and used. It should be understood that implementation of other variations and modifications of the invention in its various aspects will be apparent to those skilled in the art, and that the invention is not limited thereto by the specific embodiments described. It is therefore contemplated to cover by the present invention any and all modifications, variations or equivalence that fall within the true spirit and scope of the basic underlying principles disclosed and claimed herein.

What is claimed is:

1. A holographic 1×N single-mode fiber optic coupler for dividing a substantially monochromatic single-mode fiber optics input into N single-mode outputs, comprising:
    input means for input of a substantially monochromatic single-mode fiber optical signal;
    holographic means for holographically imaging the substantial monochromatic single-mode fiber optical signal into a predetermined array of N substantially monochromatic single-mode optical signals; and
    output means for coupling the N optical signals to N output optical fibers.

2. The holographic 1×N single-mode fiber optics coupler of claim 1 wherein the holographic means comprises a transmission hologram.

3. The holographic 1×N single-mode fiber optics coupler of claim 1 wherein the holographic means comprises a reflection hologram.

4. The holographic 1×N single-mode fiber optics coupler of claim 1 wherein the holographic means comprises a hologram for producing a virtual image of the predetermined array of N single mode optical signals upon illumination by the input optical signal and a lens for forming a real image from the virtual image.

5. The holographic 1×N single-mode fiber optics coupler of claim 1 wherein the holographic means comprises two holographic elements, each having chromatic dispersion properties which compensate for the chromatic dispersion properties of the other.

6. The holographic 1×N single-mode fiber optics coupler of claim 1 wherein the holographic means comprises a hologram recorded using a lens to focus a reference source onto the hologram to permit a real image to be formed upon illumination of the hologram by the input optical signal.

7. The holographic 1×N single-mode fiber optics coupler of claim 1 wherein the holographic means comprises a hologram recorded utilizing a phase conjugating mirror to form a reference source focused onto the hologram.

8. The hologram 1×N single-mode fiber optics coupler of claim 1 wherein the holographic means comprises a hologram recorded utilizing a reference optical source and a object optical source wherein the reference source is of substantially greater intensity than the object optical source.

9. The holographic 1×N single-mode fiber optic coupler of claim 1 wherein the holographic means comprises a hologram recorded by directing N object optical signals from an array of N single-mode optical fibers corresponding to the N output optical fibers and a reference signal from a reference single-mode optical fiber source onto a hologram recording surface to permit the imaging of the array of N optical signals to the N output optical fibers upon illumination of the hologram by the input optical signal.

10. The holographic 1×N single-mode fiber optics coupler of claim 9 wherein the hologram is recorded and developed in situ providing automatic alignment of the N input optical fibers.

11. The holographic 1×N single-mode fiber optic coupler of claim 9 wherein the N object optical signals and reference signal are diverging, overlapping and substantially monochromatic optical beams.

12. A method of holographically coupling a substantially monochromatic single-mode fiber optics input to N single-mode fiber optics outputs, comprising the steps of:

inputting a substantially monochromatic single-mode fiber optical signal;

holographically imaging the substantially monochromatic single-mode fiber optical signal into a predetermined array of N single-mode optical signals; and coupling the N optical single-mode signals to N output optical fibers.

13. The method of claim 12 wherein the step of holographically imaging further comprises the steps of generating a virtual image of a predetermined array of N single-mode optical signals from a hologram and generating a real image from the virtual image utilizing a lens.

14. The method of claim 12 wherein the step of holographically imaging comprises recording a hologram by directing optical signals from an array of N single-mode fibers and a reference single-mode optical fiber source onto a hologram recording surface, and holographically imaging by directing a reference single-mode optical fiber source onto the hologram to image the reference source into an array of N single-mode signals corresponding to the array of N single-mode fibers.

15. The method of claim 14 wherein the step of recording and imaging is performed in situ to provide automatic alignment.

* * * * *